Dec. 2, 1969   C. R. A. JOHNSON   3,482,256
RESILIENTLY MOUNTED RECORDER PEN
Filed July 12, 1968
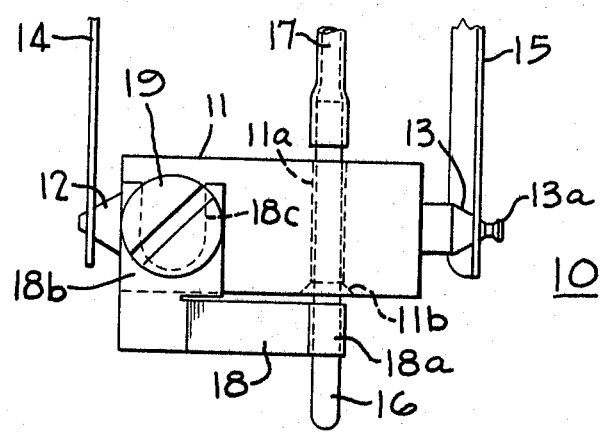
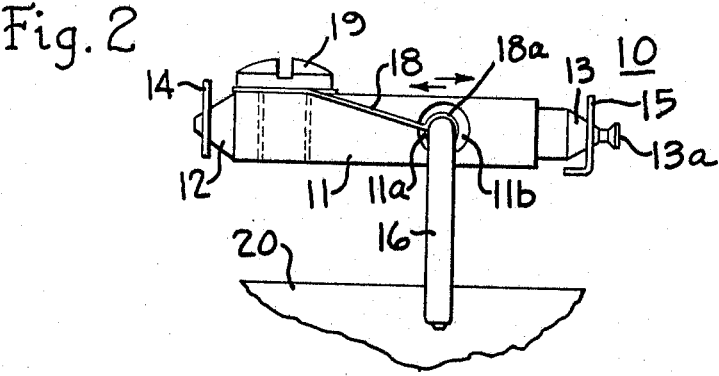
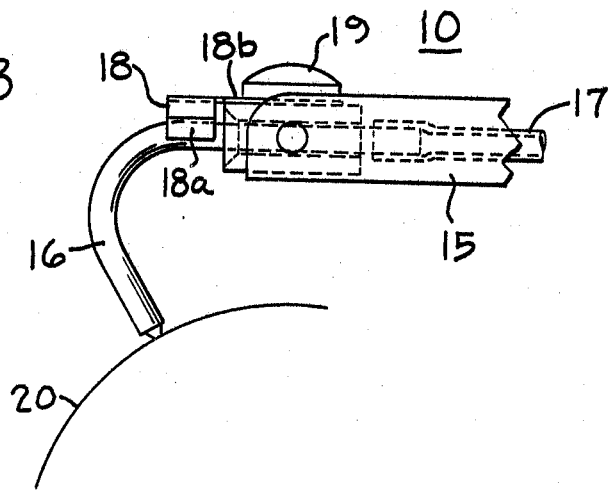

United States Patent Office 3,482,256
Patented Dec. 2, 1969

1

3,482,256
RESILIENTLY MOUNTED RECORDER PEN
Curtis R. A. Johnson, Flourtown, Pa., assignor to Leeds & Northrup Company, Philadelphia, Pa., a corporation of Pennsylvania
Filed July 12, 1968, Ser. No. 744,363
Int. Cl. G01d 15/16
U.S. Cl. 346—139                                          3 Claims

ABSTRACT OF THE DISCLOSURE

A pivotally mounted pen for a strip chart, round chart, or drum type recorder wherein a pen is supported from a pen carriage which moves along guide structure. The pen is supported from the carriage and constrained toward a central writing position with respect to the carriage by means of a resilient member fastened to both the pen carriage of the recorder and the pen.

BACKGROUND OF THE INVENTION

In pen and ink type recording instruments when the chart drive is operated to advance the paper at slow speeds and the carriage is responding to a condition which causes the carriage to make short quick excursions backwards and forwards across the chart as the result of a measured quantity changing rapidly in an oscillatory manner or move rapidly to and fro due to any other reason, for example, by the use of circuitry intentionally to produce "jitter," much difficulty has been encountered due to failure of the pen to ink properly. It has been found that with the slow paper speeds and "jittery" movement of the pen a rigidly mounted pen tends to scuff the paper surface and the fibers of the roughened paper tend to enter the pen bore and clog it. Applicant has discovered that by provision of a resilient mounting for the pen the pen can be made less sensitive to the short rapid lateral excursions of the pen carriage. For very short lateral excursions the writing point of the pen will remain substantially stationary on the chart and for wider excursions a resilient connection appears to soften the action of the pen upon the paper in a manner to reduce scuffing.

SUMMARY OF THE INVENTION

In accordance with the present invention, applicant provides an inking system useful in graphic recorders. This invention has particular utility with respect to inking systems of the type including a capillary pen for marking on a recorder chart characterized by the pen being resiliently supported with respect to the pen carriage by means which biases the writing point of the pen toward a fixed marking position with respect to the pen carriage while at the same time permitting limited lateral movement of the pen carriage with substantially no lateral motion of the writing point of the pen for short excursions of said carriage and permitting the point of said pen to move more smoothly over the chart in avoidance of scuffing upon oscillation of the pen carriage over a wider range.

BRIEF DESCRIPTION OF THE DRAWINGS

For a more detailed understanding of the invention, reference is made in the following description of a preferred embodiment thereof to the accompanying drawing in which:
FIG. 1 is a top plan view of a pen mounted in accordance with applicant's invention,
FIG. 2 is a front elevation of the pen arrangement shown in FIG. 1, and
FIG. 3 is a side elevation of the pen arrangement shown in FIGS. 1 and 2.

2

DESCRIPTION OF THE PREFERRED EMBODIMENT

The pen used to illustrate applicant's invention is of the type shown in U.S. Patents 3,071,772—C. R. A. Johnson et al, and 3,296,623—C. R. A. Johnson. Since these two patents clearly show the relationship between the various mechanisms of such recorders, the present disclosure need not.

Referring to FIGS. 1-3 and particularly FIG. 1, there is disclosed a capillary pen assembly 10 comprised of a pivot block 11 having conical shaft end portions 12 and 13 which support the block in arms 14 and 15 which project from and are a part of a pen carriage not shown. The conical pivot 13 has a portion 13a to prevent accidental dislodgement of the pivoted block 11 from the arms 14 and 15 as disclosed and claimed in U.S. Patent 3,296,623.

The pivot block 11 has a through hole 11a which is a loose, clearance fit with respect to the capillary tube of a capillary pen 16 to which is attached a flexible capillary tube 17 to convey ink to the capillary pen from an inkwell not shown. The capillary pen 16 is supported centrally of the hole 11a and the counter sunk portion thereof 11b by means of a leaf spring 18. The leaf spring 18 has a curved end portion 18a which wraps partially around the capillary tube of pen 16 to which it is soldered or otherwise affixed. The other end of the leaf spring 18 has a laterally extending tab 18b secured to the pivot block 11 by means of a screw 19. To facilitate insertion of the tab 18b under the head of the screw 19 without the necessity of completely removing the screw the tab 18b desirably includes a slot 18c.

In the side elevation, FIG. 3, there is shown the relationship between the point of the pen 16 and a chart 20 of a recorder not shown.

Referring to FIG. 2 it is believed apparent since the pen 16 is mounted on spring 18 that small amounts of lateral movement of the support arms 14 and 15 of the pen carriage (not shown), known as "jitter" results in lateral excursions of the pivot block 11 in the direction of the arrows. For short lateral movements of the pivot block 11 the leaf spring 18 is capable of flexing an amount sufficient to permit the writing point of the capillary pen 16 to remain substantially stationary with respect to its marking position on the chart 20 due to the friction between the paper and the pen, thus the pen carriage has limited lateral movement with substantially no lateral movement of the point of the pen. The centering effect of the spring will center the pen tip to maintain accuracy when "jitter" is absent. For longer lateral excursions of the pivot block 11 in the direction of the arrows as a result of "jitter" of the pen carriage, the point of the capillary pen 16 will remain stationary for a portion of the movement and thereafter be tipped very slightly and slide freely across the chart in the direction of lateral movement of the pivot block. When this "jitter" of increased magnitude exists the spring will tend to average the "jitter" signal. In actual operation over long periods of testing pen structures constructed and arranged in accordance with applicant's invention produced a very satisfactory record, the "dead band" of the instrument was not increased by a noticeable amount and periodic clogging of the bore of the pen was virtually eliminated.

While for purposes of illustration applicant's invention has been described in connection with a pivoted type of capillary pen it is clearly evident that other types of pen and carriage arrangements may be constructed utilizing features of applicant's invention.

What is claimed is:
1. A pen system for a graphic recorder of the type having a pen carriage which moves backwards-and-for- wards along guide structure in accordance with the value of a measured quantity characterized by:
- a pen, and
- resilient means supporting said pen from said pen carriage, said resilient means biasing the writing point of said pen toward a fixed marking position with respect to said pen carriage while at the same time permitting limited lateral movement of said pen carriage with substantially no lateral motion of the writing point of said pen for short excursions of said pen carriage.

2. A pen system in accordance with claim 1 wherein: said pen carriage includes a pair of pivot bearings, a pivot block supported in said pivot bearings, a capillary pen having a capillary tube passed through a clearance hole in said pivot block, and
spring means supporting said capillary pen substantially centrally of said hole in said pivot block, and biasing the writing point of said pen toward a fixed marking position with respect to said pen carriage.

3. A pen system in accordance with claim 2 wherein: said spring means is a leaf spring having one end fastened to said pivot block and the other fastened to said capillary pen.

References Cited

UNITED STATES PATENTS

| | | | |
|---|---|---|---|
| 2,973,237 | 2/1961 | Whiteley | 346—140 |
| 3,071,772 | 1/1963 | Johnson et al. | 346—140 X |
| 3,296,623 | 1/1967 | Johnson | 346—139 |

FOREIGN PATENTS 219,019  5/1909  Germany.

JOSEPH W. HARTARY, Primary Examiner.